(12) United States Patent
Shetty

(10) Patent No.: US 7,953,162 B2
(45) Date of Patent: May 31, 2011

(54) USE OF DIFFERENTIAL PAIR AS SINGLE-ENDED DATA PATHS TO TRANSPORT LOW SPEED DATA

(75) Inventor: Naresh B. Shetty, Fremont, CA (US)

(73) Assignee: Intersil Americas Inc., Milpitas, CA (US)

( * ) Notice: Subject to any disclaimer, the term of this patent is extended or adjusted under 35 U.S.C. 154(b) by 851 days.

(21) Appl. No.: 11/601,070

(22) Filed: Nov. 17, 2006

(65) Prior Publication Data

US 2008/0117994 A1    May 22, 2008

(51) Int. Cl.
*H04B 3/00* (2006.01)
(52) U.S. Cl. ......... 375/257; 370/318; 370/317; 370/311
(58) Field of Classification Search .................. 375/257
See application file for complete search history.

(56) References Cited

U.S. PATENT DOCUMENTS

| | | | | |
|---|---|---|---|---|
| 3,587,044 A | * | 6/1971 | Jenkins | 714/815 |
| 3,676,583 A | * | 7/1972 | Morita et al. | 386/204 |
| 4,092,596 A | * | 5/1978 | Dickinson et al. | 375/286 |
| 4,445,048 A | * | 4/1984 | Graham | 307/42 |
| 4,486,739 A | * | 12/1984 | Franaszek et al. | 341/59 |
| 4,527,079 A | * | 7/1985 | Thompson | 326/78 |
| 4,658,156 A | * | 4/1987 | Hashimoto | 327/51 |
| 4,803,638 A | * | 2/1989 | Nottingham et al. | 702/36 |
| 4,818,896 A | * | 4/1989 | Cavanna | 326/90 |
| 4,853,560 A | * | 8/1989 | Iwamura et al. | 326/80 |
| 5,016,269 A | * | 5/1991 | Rogers | 455/404.1 |
| 5,059,835 A | * | 10/1991 | Lauffer et al. | 327/437 |
| 5,067,007 A | * | 11/1991 | Otsuka et al. | 257/701 |
| 5,126,686 A | * | 6/1992 | Tam | 330/134 |
| 5,144,167 A | * | 9/1992 | McClintock | 326/71 |
| RE34,808 E | * | 12/1994 | Hsieh | 326/71 |
| 5,422,760 A | * | 6/1995 | Abbott et al. | 360/46 |
| 5,459,607 A | * | 10/1995 | Fellows et al. | 398/154 |
| 5,506,521 A | * | 4/1996 | Collins | 326/126 |
| 5,521,530 A | * | 5/1996 | Yao et al. | 326/80 |
| 5,557,219 A | * | 9/1996 | Norwood et al. | 326/49 |
| 5,589,783 A | * | 12/1996 | McClure | 326/71 |
| 5,689,195 A | * | 11/1997 | Cliff et al. | 326/41 |
| 5,715,274 A | * | 2/1998 | Rostoker et al. | 375/130 |
| 5,742,178 A | * | 4/1998 | Jenkins et al. | 326/33 |
| 5,742,798 A | * | 4/1998 | Goldrian | 713/400 |
| 5,801,548 A | * | 9/1998 | Lee et al. | 326/44 |
| 5,812,461 A | * | 9/1998 | Komarek et al. | 365/189.05 |
| 5,856,952 A | * | 1/1999 | Yoo et al. | 365/230.08 |

(Continued)

OTHER PUBLICATIONS

International Search Report and Written Opinion for PCT/US2007/079715, dated Jun. 2, 2008.

(Continued)

*Primary Examiner* — Chieh M Fan
*Assistant Examiner* — Santiago Garcia
(74) *Attorney, Agent, or Firm* — Fliesler Meyer LLP

(57) ABSTRACT

Provided herein are systems and methods for transmitting signals across a pair of wires. In accordance with specific embodiments, a differential signal is transmitted across the pair of wires during one period of time, and two single-ended signals are transmitted across the same pair of wires during another period of time. Low voltage differential signaling (LVDS) can be used to transmit the differential signal across the pair of wires. In contrast, non-differential signaling can be used to transfer the two singled-ended signals across the same pair of wires.

27 Claims, 5 Drawing Sheets

U.S. PATENT DOCUMENTS

| | | | |
|---|---|---|---|
| 5,872,810 A * | 2/1999 | Philips et al. | 375/222 |
| 5,872,811 A * | 2/1999 | Gusinov | 375/257 |
| 5,912,920 A * | 6/1999 | Marchok et al. | 375/219 |
| 5,936,423 A * | 8/1999 | Sakuma et al. | 326/16 |
| 5,939,904 A * | 8/1999 | Fetterman et al. | 327/67 |
| 5,949,253 A * | 9/1999 | Bridgewater, Jr. | 326/86 |
| 5,958,026 A * | 9/1999 | Goetting et al. | 710/52 |
| 5,970,255 A * | 10/1999 | Tran et al. | 710/73 |
| 5,982,833 A * | 11/1999 | Waters | 375/372 |
| 6,005,895 A * | 12/1999 | Perino et al. | 375/288 |
| 6,130,563 A * | 10/2000 | Pilling et al. | 327/111 |
| 6,134,214 A * | 10/2000 | Takagi et al. | 369/47.14 |
| 6,175,952 B1 * | 1/2001 | Patel et al. | 716/18 |
| 6,178,215 B1 * | 1/2001 | Zhang et al. | 375/371 |
| 6,215,326 B1 * | 4/2001 | Jefferson et al. | 326/41 |
| 6,222,388 B1 * | 4/2001 | Bridgewater, Jr. | 326/86 |
| 6,226,356 B1 * | 5/2001 | Brown | 379/24 |
| 6,229,336 B1 * | 5/2001 | Felton et al. | 326/38 |
| 6,236,231 B1 * | 5/2001 | Nguyen et al. | 326/39 |
| 6,243,776 B1 * | 6/2001 | Lattimore et al. | 710/104 |
| 6,252,419 B1 * | 6/2001 | Sung et al. | 326/38 |
| 6,256,235 B1 * | 7/2001 | Lee | 365/189.11 |
| 6,256,689 B1 * | 7/2001 | Khosrowpour | 710/300 |
| 6,271,679 B1 * | 8/2001 | McClintock et al. | 326/38 |
| 6,281,715 B1 * | 8/2001 | DeClue et al. | 327/65 |
| 6,282,045 B1 * | 8/2001 | Glover | 360/73.03 |
| 6,288,581 B1 * | 9/2001 | Wong | 327/108 |
| 6,294,924 B1 * | 9/2001 | Ang et al. | 326/30 |
| 6,313,682 B1 * | 11/2001 | Muller et al. | 327/291 |
| 6,323,687 B1 * | 11/2001 | Yano | 326/83 |
| 6,346,832 B1 * | 2/2002 | Young | 327/108 |
| 6,366,128 B1 * | 4/2002 | Ghia et al. | 326/83 |
| 6,377,076 B1 * | 4/2002 | Gauthier | 326/86 |
| 6,389,069 B1 * | 5/2002 | Mathe | 375/232 |
| 6,400,598 B1 * | 6/2002 | Nguyen et al. | 365/63 |
| 6,407,576 B1 * | 6/2002 | Ngai et al. | 326/41 |
| 6,433,579 B1 * | 8/2002 | Wang et al. | 326/38 |
| 6,437,599 B1 * | 8/2002 | Groen | 326/63 |
| 6,448,813 B2 * | 9/2002 | Garlepp et al. | 326/83 |
| 6,453,374 B1 * | 9/2002 | Kovalan et al. | 710/100 |
| 6,515,508 B1 * | 2/2003 | Chang et al. | 326/38 |
| 6,580,930 B1 * | 6/2003 | Fulghum et al. | 455/574 |
| 6,639,434 B1 * | 10/2003 | Rahman | 327/108 |
| 6,650,140 B2 * | 11/2003 | Lee et al. | 326/39 |
| 6,650,141 B2 * | 11/2003 | Agrawal et al. | 326/41 |
| 6,683,472 B2 * | 1/2004 | Best et al. | 326/30 |
| 6,686,772 B2 * | 2/2004 | Li et al. | 326/83 |
| 6,687,775 B1 * | 2/2004 | Bassett | 710/70 |
| 6,700,403 B1 * | 3/2004 | Dillon | 326/37 |
| 6,762,625 B1 * | 7/2004 | Devnath | 326/115 |
| 6,788,116 B1 * | 9/2004 | Cook et al. | 327/108 |
| 6,810,216 B1 * | 10/2004 | Tourunen | 398/202 |
| 6,812,733 B1 * | 11/2004 | Plasterer et al. | 326/30 |
| 6,856,178 B1 * | 2/2005 | Narayan | 327/108 |
| 6,861,868 B1 * | 3/2005 | Agrawal et al. | 326/38 |
| 7,109,743 B2 * | 9/2006 | Shumarayev et al. | 326/26 |
| 7,129,739 B2 * | 10/2006 | Best et al. | 326/30 |
| 7,154,302 B2 * | 12/2006 | Best et al. | 326/86 |
| 7,215,891 B1 * | 5/2007 | Chiang et al. | 398/137 |
| 7,279,982 B1 * | 10/2007 | Zhou et al. | 330/301 |
| 7,522,670 B2 * | 4/2009 | Carballo et al. | 375/257 |
| 2002/0057101 A1 * | 5/2002 | Tang et al. | 326/29 |
| 2002/0101913 A1 * | 8/2002 | Masters et al. | 375/219 |
| 2002/0135404 A1 * | 9/2002 | Payne et al. | 327/108 |
| 2002/0180480 A1 * | 12/2002 | Dreps et al. | 326/62 |
| 2002/0186048 A1 * | 12/2002 | Tang et al. | 326/86 |
| 2003/0141919 A1 * | 7/2003 | Wang et al. | 327/390 |
| 2004/0000924 A1 * | 1/2004 | Best et al. | 326/30 |
| 2004/0022311 A1 * | 2/2004 | Zerbe et al. | 375/229 |
| 2004/0032282 A1 * | 2/2004 | Lee et al. | 326/39 |
| 2004/0051555 A1 * | 3/2004 | Wilcox et al. | 326/30 |
| 2004/0051565 A1 * | 3/2004 | Dreps et al. | 327/65 |
| 2004/0169434 A1 * | 9/2004 | Washington et al. | 310/232 |
| 2004/0203477 A1 * | 10/2004 | Carballo et al. | 455/69 |
| 2004/0203483 A1 * | 10/2004 | Carballo et al. | 455/88 |
| 2005/0104619 A1 * | 5/2005 | Best et al. | 326/30 |
| 2005/0119025 A1 * | 6/2005 | Mohindra et al. | 455/552.1 |
| 2005/0212553 A1 * | 9/2005 | Best et al. | 326/30 |
| 2005/0237082 A1 * | 10/2005 | Shumarayev et al. | 326/26 |
| 2005/0240386 A1 * | 10/2005 | Carballo et al. | 703/14 |
| 2006/0017462 A1 * | 1/2006 | Kao | 326/62 |
| 2006/0171477 A1 * | 8/2006 | Carballo et al. | 375/257 |
| 2006/0187968 A1 * | 8/2006 | Spooner | 370/503 |
| 2006/0220703 A1 * | 10/2006 | Wang et al. | 327/108 |
| 2008/0117994 A1 * | 5/2008 | Shetty | 375/257 |
| 2008/0148063 A1 * | 6/2008 | Hanko et al. | 713/189 |

OTHER PUBLICATIONS

"Low Voltage Differential Signalling," The International Engineering Consortium; Web ProForum Tutorials; http://www.iec.org/online/tutorials/acrobat/low_voltage.pdf, pp. 1-15 (at least as early as Oct. 2006).

"Understanding LVDS for Digital Test Systems," National Instruments; http://zone.ni.com/devzone/cda/tut/p/id/4441; (at least as early as Oct. 2006).

* cited by examiner

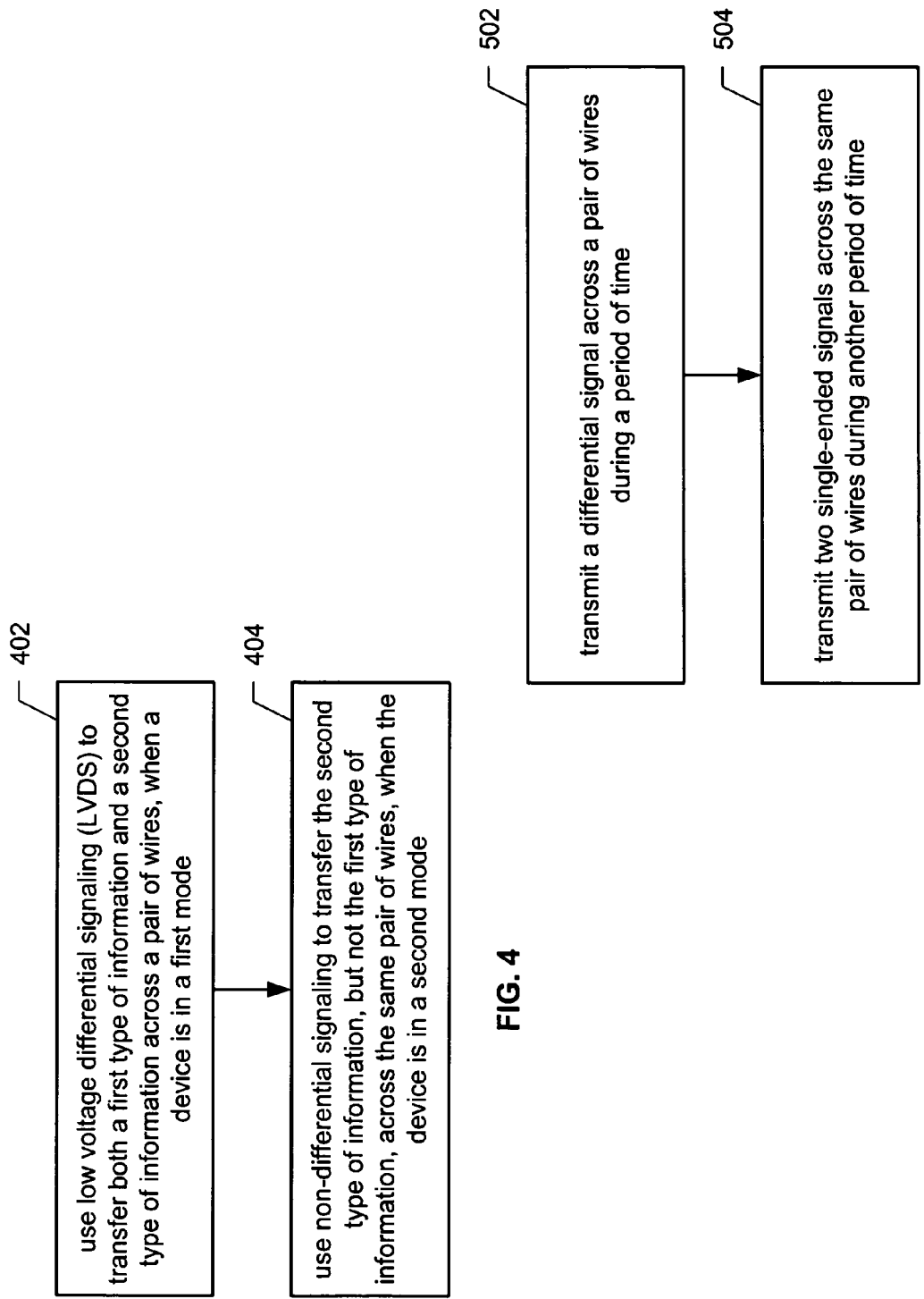

US 7,953,162 B2

USE OF DIFFERENTIAL PAIR AS SINGLE-ENDED DATA PATHS TO TRANSPORT LOW SPEED DATA

FIELD OF THE INVENTION

Embodiments of the present invention relate to the transmission and reception of both high speed and low speed serial data signals. Embodiments of the present invention also relate to the transmission and reception of both differential and single-ended signals.

BACKGROUND

Today, high speed signals such as video signals are typically sent from a source (e.g., host processor) to a sink (e.g., a display driver) using numerous single-ended signal paths along with a clock source. However, as the data rates increase, traditional complementary symmetry metal oxide semiconductor/transistor transistor logic (CMOS/TTL) signaling is prone to electromagnetic interference (EMI) related problems. In addition, as the amount of data from source to sink increases (e.g., as resolution of displays increase), the number of signals from the source to sink also increase, which results in increased power consumption to transport faster and wider signals from a source to a sink. This is undesirable, especially in portable devices. Accordingly, there is a need to reduce the power consumption that results from high speed signals being sent from sources to sinks.

SUMMARY OF THE INVENTION

Embodiments of the present invention relate to systems and methods for transmitting signals across a pair of wires. In accordance with specific embodiments, a differential signal is transmitted across the pair of wires during one period of time, and two single-ended signals are transmitted across the same pair of wires during another period of time. Low voltage differential signaling (LVDS) can be used to transmit the differential signal across the pair of wires. In contrast, non-differential signaling can be used to transfer the two singled ended signals across the same pair of wires. Such pair of wires can be, e.g., a twisted pair, or a pair of conductive traces, but are not limited thereto.

Embodiments of the present invention can be used, e.g., to reduce power consumption in a mobile device that has an active mode and a sleep or standby mode. In accordance with specific embodiments, the LVDS is performed when a device is in an active mode, and the non-differential signaling is used when the device is in a sleep or standby mode. Stated another way, the pair of wires can be used as a single differential pair, when the device is in a first mode (e.g., active mode), and the same pair of wires can be used as two separate serial lines (e.g., I2C type SDA and SCL lines), when the device is in the second mode (e.g., sleep or standby mode).

In accordance with specific embodiments of the present invention, a system includes a transmitter having a pair of outputs, and a receiver having a pair of inputs. The pair of outputs of the transmitter are configured to be connected, by a pair of wires, to the two inputs of the receiver. The transmitter, when in a first mode (e.g., active mode), outputs a differential signal at the two outputs to transmit across the two wires to the two inputs of the receiver. In contrast, when the transmitter is in a second mode (e.g., sleep or standby mode), the transmitter outputs two single-ended signals, one at each of the two outputs, to transmit across the same two wires to the two inputs of the receiver.

In accordance with specific embodiments, the receiver can also be in the first mode and the second mode. The receiver can treat signals received at its two inputs as a differential signal, when the receiver is in the first mode; and the receiver can treat signals received at its two inputs as single-ended signals when the receiver is in the second mode.

In accordance with specific embodiments, the transmitter and receiver each include a pair of switches that are used to specify whether I2C signals are to be transmitted as either an embedded portion of a differential signal across the pair of wires, or as two separate single-ended signals across the same pair of wires.

Further embodiments, and the features, aspects, and advantages of the present invention will become more apparent from the detailed description set forth below, the drawings and the claims.

BRIEF DESCRIPTION OF THE DRAWINGS

FIGS. 4 and 5 are high level flow diagrams that are useful for summarizing specific embodiments of the present invention.

DETAILED DESCRIPTION

Various signals need to be sent from a source to a sink, e.g., when the source is a host processor and the sink is a display driver. Such signals can include RGB signals, horizontal and vertical synchronization signals (HSYNC and VSYNC), a processor clock signal (PCLKIN), a data enable signal (DATAEN) and a reset/power down signal (RESET/PWRDN). Also, additional low speed control signals, such as Inter-Integrated Circuit (I2C) signals, may also need to be sent. An example of this is shown in FIG. 1, described below.

Figure 1:
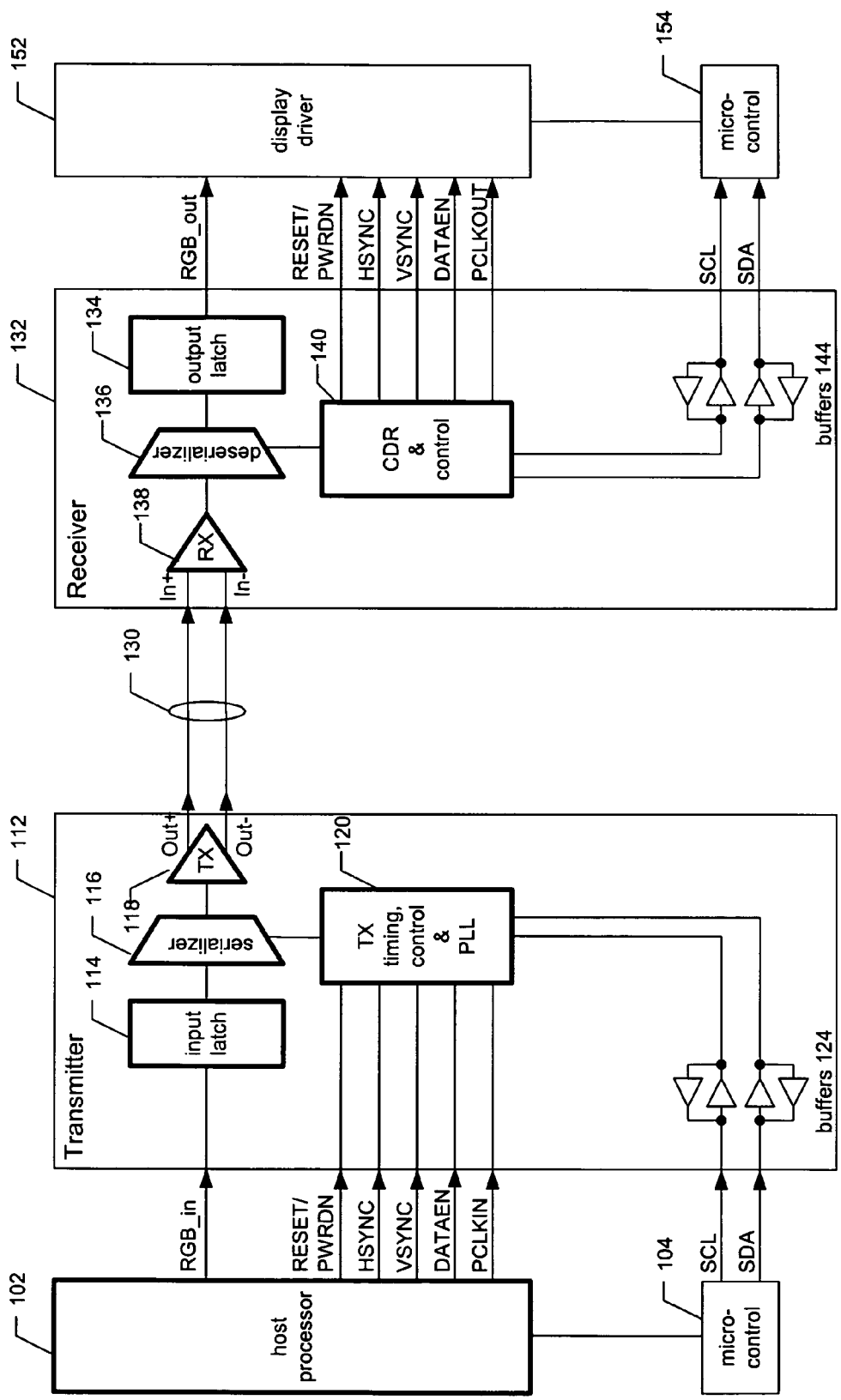
FIG. 1 is a high level block diagram which is useful for explaining one scheme for transferring both high speed and low speed signals between a transmitter and a receiver.

FIG. 1 shows a transmitter 112 and a receiver 132 that are used to send video signals from a host processor 102 (also referred to simply as a host) to a display driver 152. The display driver 152, which likely includes column and row drivers, drives a display (not shown), such as a liquid crystal display (LCD) of a mobile phone, camera, or other mobile device.

The transmitter 112 is shown as including an input latch 114, a serializer 116, an output stage 118 and a timing, control and phase locked loop (PLL) block 120. The receiver 132 is shown as including an input stage 138, a deserializer 136, an output latch 134, as well as a clock and data recovery (CDR) and control block 140.

The host is shown as providing RGB, RESET/PWRDN, HSYNC, VSYNC, DATAEN and PCLKIN signals to the transmitter 112, so that the transmitter 112 can send such signals, or other signals indicative of such signals, to the receiver 132. Additionally, lower speed I2C signals, including serial clock (SCL) and serial data (SDA) signals are provided to the transmitter 112 for sending to the receiver 132. The SCL and SDA signals are shown as being generated by a micro-controller 104 that is in communication with the host 102, but instead can be generated by the host 102 or some other component. While a further micro-controller 154 is shown as receiving the SCL and SDA signals, such signals can instead be provided to the display driver 152 or some other component.

A pair of wires 130 connect the output stage 118 of the transmitter 112 to the input stage 138 of the receiver 132. The serializer 116 and output stage 118 together with the input stage 138 and deserializer 136 enable the use of a low voltage differential signaling (LVDS) based serialization and deserialization (SERDES) scheme to be used to send data across the pair of wires 130 in a fast and power efficient manner that avoids EMI problems. Additionally, the CDR circuit 140 is used to eliminate the need to send separate clock signal(s) on separate wire(s).

The serializer 116 converts the parallel RGB bits, received via the input latch 114, to a serial signal. Additionally, the serializer 116 embeds the RESET/PWRDN, HSYNC, VSYNC, DATAEN and PCKLIN signals, or signals representative thereof, into the serial signal. Also, in the embodiment shown in FIG. 1, the serializer 116 also embeds the SCL and SDA signals, or signals representative thereof, into the serial signal. The serializer uses a time multiplexing scheme to embed the various signals into the serial signal.

To provide for low power and high speed communication, low voltage differential signaling (LVDS) is used to send the serial data signal from the transmitter 112 to the receiver 132. To accomplish this, the output stage 118 converts the single-ended serial data signal output by the serializer 116 into a differential signal with low voltage swings, in a well known manner. In addition to providing for low power and high speed communication, this transmission scheme provides for good common-mode rejection and noise immunity. Because of its operation, the output stage 118 can also be referred to as a LVDS transmitter 118. LVDS provides for transmission in the GHz range, or at least the MHz range. In contrast, I2C provides for transmission in the 100-400KHz range.

The high speed differential signals are sent from the transmitter 112 to the receiver 132 across the pair of wires 130. Such wires 130 can be a twisted-pair, but need not be. Further, since the term "wire" as used herein refers to a conductive signal path, the pair of wires 130 can be a pair of conductive traces.

The input stage 138 converts the LVDS differential signal received across the pair of wires 130 to a single-ended serial digital signal. Because of its operation, the input stage 138 can also be referred to as a LVDS receiver. The deserializer 136 receives the single-ended serial signal, from the output of the input stage 138, and provides parallel RGB bits to the output latch 134. The deserialzier 136 also provides the RESET/PWRDN, HSYNC, VSYNC, DATAEN and PCKLIN signals, or signals representative thereof, to the CDR and control block 140. The CDR and control block 140 recovers the clock signal(s), and provides RESET/PWRDN, HSYNC, VSYNC, DATAEN and PCKLOUT signals to the display driver 152. Additionally, in this embodiment, the deserializer 136 de-embeds the SCL and SDA signals, or signals representative thereof, and the CDR and control block 140 provides those signals to the micro-controller 154, or to the display driver 152 or some other component. The deserializer 136 uses time de-multiplexing to separate out all the various signals that were combined by the serializer 116 into a serial signal.

Presuming the components shown in FIG. 1 are within a mobile device, such as a cell phone or camera, it is likely that the device would be in sleep mode or standby mode a majority (e.g., 80%) of the time, to preserve the device's battery life. While in sleep or standby mode, it is preferably to have as many components as possible inactive, so that they are not drawing power. For example, while the transmitter 112 is in sleep or standby mode, it may be desired that all components involved in high speed communications be inactive, including the input latch 114, the serializer 116, the LVDS transmitter 118 and the timing, control and PLL block 120 (all shown in heavy lines in the FIGS.). Nevertheless, even during sleep mode there is often still a need to send low speed data signals, such as the I2C signals (SCL and SDA), e.g., from the micro-controller 104 to the micro-controller 154. For this reason, the embodiment of FIG. 1 is power inefficient, because at least the timing, control and PLL block 120, serializer 116, output stage 118 of the transmitter, and the input stage 138, deserializer 136 and CDR and control block 140 of the receiver, would still need to be powered to enable the low speed (e.g., SCL and SDA) lines to be transmitted. This can result, e.g., in exercising a circuit at 25 MHz to transport a 100 KHz control signal, which is not an efficient scheme.

Figure 2:
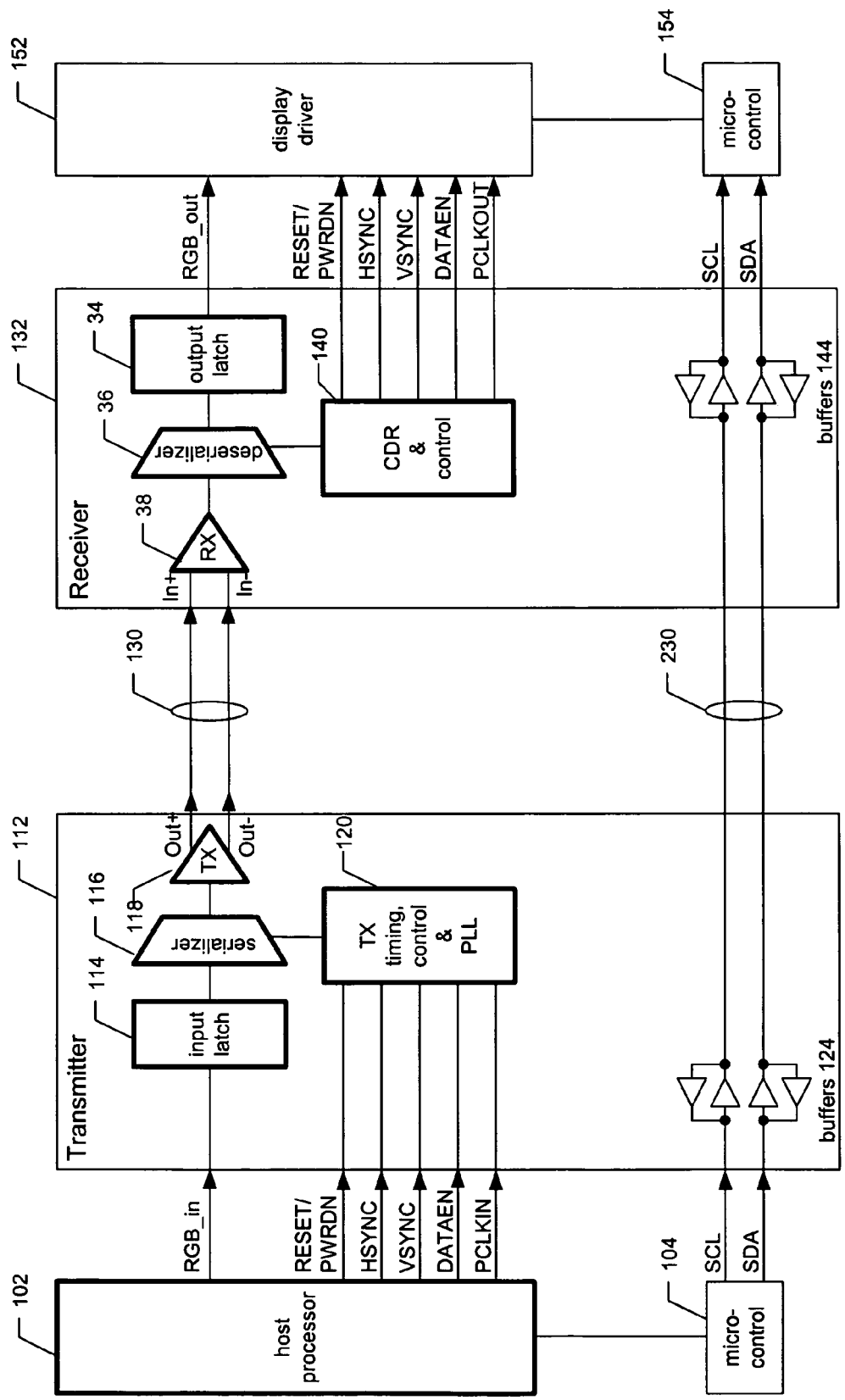
FIG. 2 is a high level block diagram which is useful for explaining an alternative scheme for transferring both high speed and low speed signals between a transmitter and a receiver. The scheme of FIG. 2 allows for less power consumption than the scheme of FIG. 1, but requires more wires between the transmitter and receiver.

As shown in FIG. 2, one way to avoid the just mentioned power inefficiency problem would be to provide two additional wires 230 between the transmitter 112 and the receiver 132, with the additional wires 230 being dedicated to transferring the low speed (e.g., I2C) signals. However, this is not preferred, as it is desirable to not increase the number of wires between components. Embodiments of the present invention, as described below with reference to FIG. 3, provide for a more eloquent solution that does not increase the number of wires between the transmitter 112 and the receiver 132.

Figure 3:
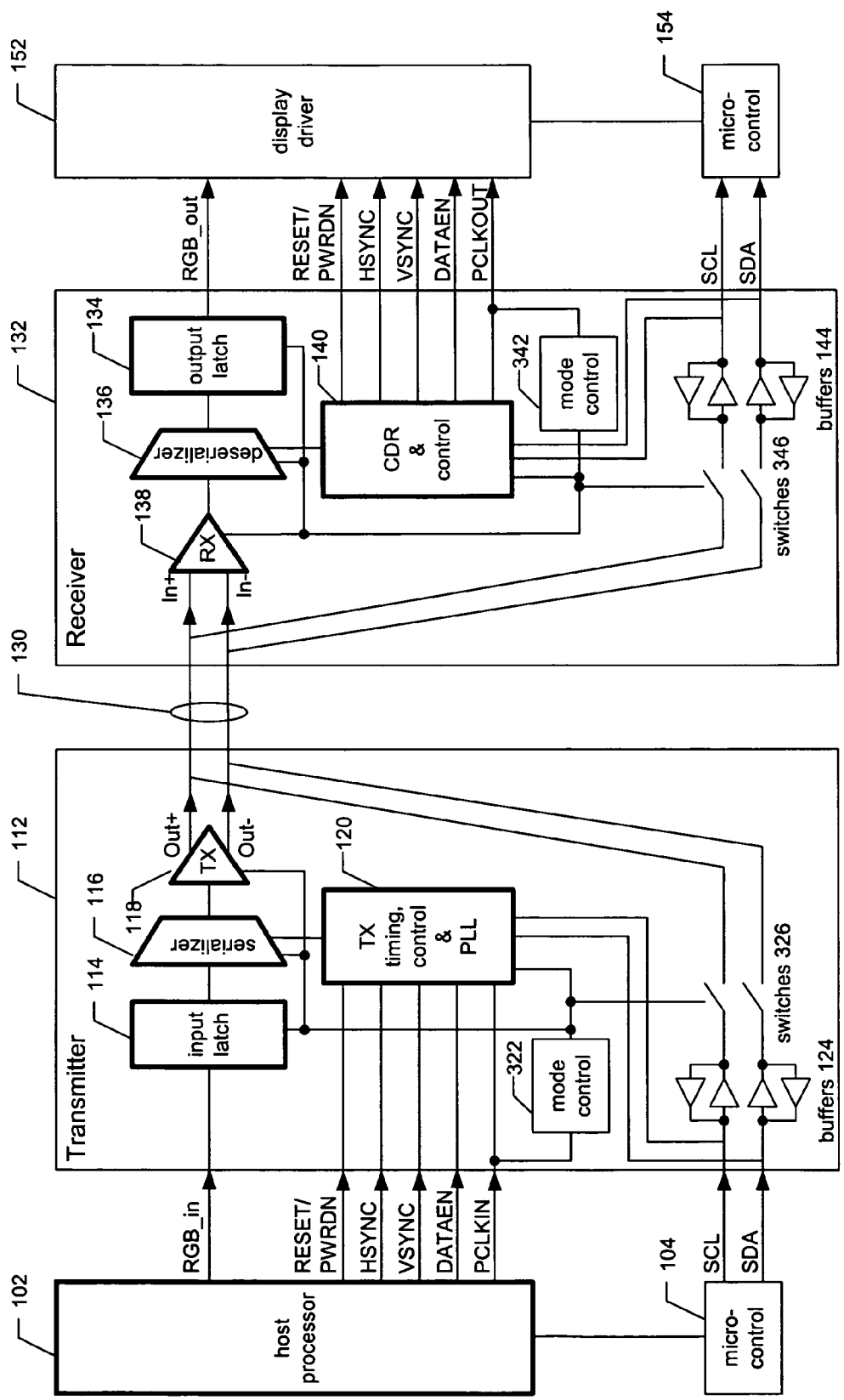
FIG. 3 is a high level block diagram which is useful for explaining embodiments of the present invention that can be used to reduce power consumption without increasing the number of wires between a transmitter and a receiver.

Referring to FIG. 3, a pair of switches 326 are added within the transmitter 112 and a pair of switches 346 are added within the receiver 132, for reasons that will be described below. Alternatively, but less preferably, such switches 326 and 346 can be external to the transmitter 112 and receiver 132. In accordance with an embodiment, switches 326 and 346 are analog switches implemented using transistors.

In accordance with an embodiment, the switches 326 and 346 are open (i.e., off) when there is a need to send high speed signals between the transmitter 112 and the receiver 132, e.g., when the host is providing high speed RGB, RESET/PWRDN, HSYNC, VSYNC, DATAEN and PCKLIN signals as an embedded LVDS signal to the transmitter 112. When the switches 326 and 346 are open (i.e., off), the low speed control signals (e.g., SCL and SDA) are also embedded by the transmitter 112 into the LVDS signal that is sent across the pair of wires 130, and the receiver 132 de-embeds such low speed control signals, in the same manner as was described above with reference to FIG. 1. However, when there is no need to send high speed signals between the transmitter 112 and receiver 132, e.g., when the host is not providing RGB, RESET/PWRDN, HSYNC, VSYNC, DATAEN and PCK-LIN signals to the transmitter 112, the switches 326 and 346 are closed (i.e., turned on). Additionally, when there is no need to send high speed signals between the transmitter 112 and receiver 132, the transmitter 112 and receiver 132 can be placed in sleep or standby mode, allowing all (or at least some) of the components (shown in heavy lines) involved in high speed communications to be inactive. In the transmitter 112, the components that can be inactive (and thus generally consuming only transistor leakage power) during sleep or standby mode include the input latch 114, the serializer 116, the output stage 118 and the timing, control and PLL block 120. The host 102 may also be inactive, or at least in a lower power mode. In the receiver 132, the components that can be inactive during sleep or standby mode include the input stage 138, the deserializer 136, the output latch 134 and the CDR and control block 140.

A mode controller 322 within the transmitter 112 and a mode controller 342 within the receiver 132 can be used to detect when it is appropriate for the transmitter 112 and the receiver 132 to be in a sleep or standby mode, as opposed to an active mode. As the terms are generally used herein the terms "sleep" and "standby" are used to identify power saving modes where certain components are fully or at least partially inactive. However, it should be noted that it is also possible that there can be more than one selectable power saving mode, e.g., where one mode saves more power than another.

There are various ways in which the mode controllers 322 and 342 can determine when to cause the transmitter 112 and receiver 132 to go into a sleep or standby mode, or more generally, into a reduced power mode. For example, the mode controller 322 can monitor the PCLKIN signal, and the mode controller 342 can monitor the PCLKOUT signal, as shown in FIG. 3. In this manner, when the mode controller 322 does not detect the PCLKIN signal (e.g., for at least a specified period of time) the mode controller 322 can cause the transmitter 112 to go into sleep or standby mode. Similarly, when the mode controller 342 does not detect the PCLKOUT signal (e.g., for at least a specified period of time) the mode controller 342 can cause the receiver 132 to go into sleep or standby mode. It is also possible that alternative signals, such as the DATAEN signal, be monitored for determining when to switch between sleep or standby mode and active mode. In other words, the mode controllers 322 and 342 can monitor the presence or absence of a signal to know when the transmitter 112 and receiver 132 should be in a sleep/standby mode, or in active mode.

As shown in FIG. 3, the mode controller 322 can also be used to control the switches 326, and the mode controller 342 can also be used to control the switches 346. More specifically, in accordance with an embodiment of the present invention, the mode controller 322 closes (i.e., turns on) the pair of switches 326 when the mode controller 322 causes the transmitter 112 to go into sleep or standby mode, and opens (i.e., turns off) the pair of switches 326 when the mode controller 322 causes the transmitter 112 to go back to active mode. Similarly, the mode controller 342 closes (i.e., turns on) the pair of switches 346 when the mode controller 132 causes the receiver 132 to go into sleep or standby mode, and opens (i.e., turns off) the pair of switches 346 when the mode controller 342 causes the receiver 132 to go back to active mode. The mode controllers 322 and 342 can be simple state machines or the like, as would be appreciated by one of ordinary skill in the art.

When the switches 326 and 346 are closed (i.e., turned on), the low speed signals (e.g., SCL and SDA) are transmitted from the transmitter 112 to the receiver 132 via the same pair of wires 130 that are used for high speed low voltage differential signaling (LVDS) when the transmitter 112 and receiver 132 are in active mode. However, when the pair of wires 130 are used for high speed LVDS (and the switches 326 and 346 are open), the pair of wires are used as a differential pair. In contrast, when the switches 326 and 346 are closed (i.e., turned on), the pair of wires 130 are used to transmit low speed signals, with the pair of wires being used as two separate single-ended serial lines, e.g., one which transmits an SCL signal, and the other which transmits an SDA signal.

As shown in FIG. 3, buffers 124 and 144 are provided to enable bi-directionality of slow speed data, impedance matching, and circuit isolation The high level flow diagram of FIG. 4 is useful for summarizing specific embodiments of the present invention that can be used, e.g., to reduce power consumption in a mobile device that has a first mode (e.g., an active mode) and a second mode (e.g., a sleep or standby mode). Referring to FIG. 4, at a step 402, low voltage differential signaling (LVDS) is used to transfer both a first type of information (e.g., high speed data and clock) and a second type of information (e.g., low speed I2C data and clock) across a pair of wires (e.g., 130), when the device is in the first mode (e.g., active mode). In contrast, as shown at step 404, non-differential signaling is used to transfer the second type of information (e.g., the low speed I2C data and clock), but not the first type of information (e.g., the high speed data and clock), across the same pair of wires (e.g., 130), when the device is in the second mode (e.g., sleep or standby mode).

In accordance with specific embodiments, at step 402, the pair of wires (e.g., 130) are used as a single differential pair, when the device is in the first mode (e.g., active mode). In contrast, at step 404, the pair of wires (e.g., 130) are used as two separate single-ended serial lines, when the device is in the second mode (e.g., sleep or standby mode).

FIG. 5 is a high level flow diagram that also summarizes specific embodiments of the present invention. As shown in FIG. 5, at a step 502, a differential signal is transmitted across a pair of wires during a period of time; and at a step 504 two single-ended signals are transmitted across the same pair of wires during another period of time. As explained above, low voltage differential signaling (LVDS) can be used to transmit the differential signal across the pair of wires; and non-differential signaling can be used to transfer the two single-ended signals across the same pair of wires. As explained above, the pair of wires can be, but are not limited to, a twisted pair or a pair of conductive traces. In specific embodiments, step 502 can be performed when a device is in an active mode; and step 504 can be performed when a device is in a sleep or standby mode.

In FIG. 3 the transmitter 132 is shown as being associated with a host processor 102 that transmits video and control signals to a receiver 132 that is shown as being associated with a display driver 152. However, such an environment is only one exemplary environment in which embodiments of the present invention can be used. One of ordinary skill in the art would understand, from the above description, that embodiments of the present invention can be used in other environments where there is the desire to use a pair of wires for both high speed differential signaling and lower speed single-ended signaling. The reason for switching between the two types of signaling, as explained above, can be to reduce power consumption. However, there can be other reasons why this may be desired.

Figure 6:
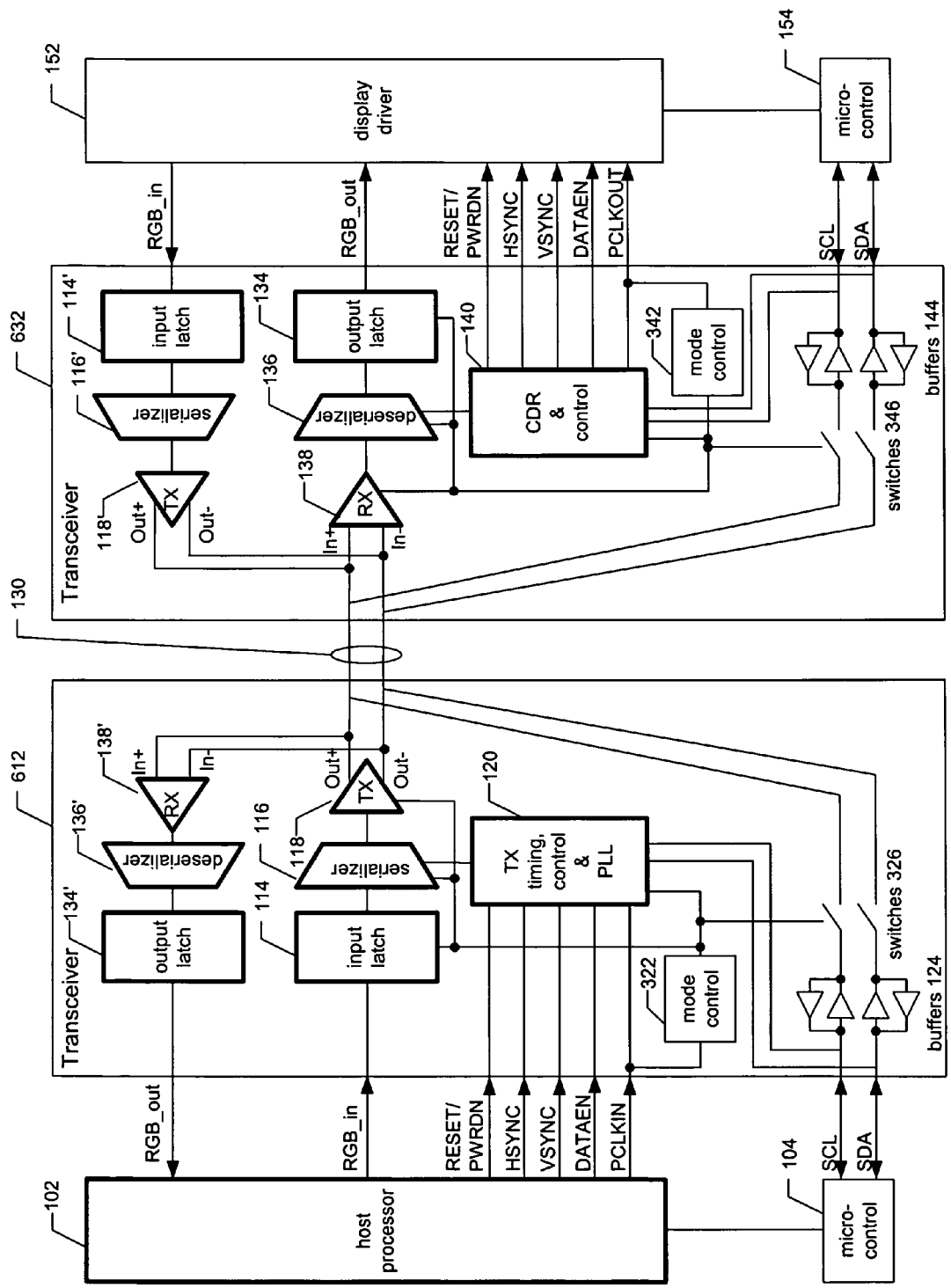
FIG. 6 is a high level block diagram illustrating how the transmitter and receivers of FIG. 3 can be portions of transceivers.

In FIG. 3, the transmitter 112 is shown as being in communication with the receiver 132. While not specifically shown in FIG. 3, the transmitter 112 can be part of a transceiver. Similarly, the receiver 132 can be part of another transceiver. An example of this is shown in FIG. 6. Although not shown, the transceiver 612 will likely also include a CDR and control block similar to 140; and the transceiver 632 will likely also include a transmit timing, control and PLL block similar to block 120. Also, while not specifically show in FIG. 6, many of the signals can be bi-directional where transceivers are used. In the embodiment shown, the transceivers provide for half-duplex communications of the SCL and SDA signals.

It is also possible that each transceiver includes a serializer/deserializer (SerDes) capable of full-duplex operation, meaning that data conversion can take place in both directions simultaneously. In such an embodiment, there wouldn't be a need for each transceiver to include a separate serializer and deserilizer.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. It is intended that the scope of the invention be defined by the following claims and their equivalents.

What is claimed is:

1. A method for transmitting signals across a pair of wires, comprising:
   (a) transmitting differential signals across the pair of wires during a period of time when a device is in an active mode, the differential signals being transmitted across the pair of wires comprising high speed video signals, and the differential signals being transmitted across the pair of wires also comprising low speed serial clock (SCL) and serial data (SDA) signals embedded with the high speed video signals; and
   (b) transmitting two single-ended signals across the same pair of wires during another period of time when the device is in a sleep or standby mode, neither of the two single-ended signals comprising the high speed video signals, one of the two single-ended signals being transmitted across one of the wires comprising the low speed serial clock (SCL) signal, and the other one of the two single-ended signals being transmitted across the other one of the wires comprising the low speed serial data (SDA) signal.

2. The method of claim 1, wherein:
   step (a) includes using low voltage differential signaling (LVDS) to transmit the differential signals across the pair of wires; and
   step (b) includes using non-differential signaling to transfer the two singled-ended signals across the same pair of wires.

3. The method of claim 1, wherein the pair of wires comprises a twisted pair.

4. The method of claim 1, wherein the pair of wires comprises a pair of conductive traces.

5. The method of claim 1, wherein the sleep or standby mode is a reduced power mode as compared to the active mode.

6. A method for reducing power consumption in a battery powered mobile device that has a first mode and a second mode, the method comprising:
   (a) using low voltage differential signaling (LVDS) to transfer high speed video signals, and low speed serial clock (SCL) and serial data (SDA) signals embedded with the high speed video signals, across a pair of wires, when the device is in the first mode; and
   (b) using non-differential signaling to transfer the low speed serial clock (SCL) signal and the low speed serial data (SDA) signals, but not the high speed video signals, across the same pair of wires, when the device is in the second mode;
   wherein when the device is in the second mode, the low speed serial clock (SCL) signal is transferred using non-differential signaling across one of the pair of wires, and the low speed serial data (SDA) signal is transferred using non-differential signaling across the other one of the pair of wires.

7. The method of claim 6, wherein:
   step (a) includes using the pair of wires as a single differential pair, when the device is in the first mode; and
   step (b) includes using the pair of wires as two separate serial lines, when the device is in the second mode.

8. The method of claim 6, wherein:
   the first mode is an active mode; and
   the second mode is a sleep or standby mode.

9. The method of claim 6, wherein the second mode is a reduced power mode as compared to the first mode.

10. The method of claim 6, wherein:
    the high speed video signals are to be transferred at a first speed that is at least 1 MHz; and
    the low speed serial clock (SCL) and serial data (SDA) signals are to be transferred at a lower speed than the first speed, the lower speed being no more than 400 KHz.

11. A system, comprising:
    a transmitter configured to transmit high speed video signals and low speed serial clock (SCL) and serial data (SDA) signals, the transmitter including a pair of outputs; and
    a receiver including a pair of inputs;
    wherein the pair of outputs of the transmitter are configured to be connected, by a pair of wires, to the pair of inputs of the receiver;
    wherein the transmitter, when in a first mode, outputs differential signals at the two outputs to transmit across the two wires to the two inputs of the receiver, the differential signals including the high speed video signals and the low speed serial clock (SCL) and serial data (SDA) signals embedded with the high speed video signals; and
    wherein the transmitter, when in a second mode, outputs two single-ended signals, one at each of the two outputs, to transmit across the same two wires to the two inputs of the receiver, one of the two single-ended signals including the low speed serial clock (SCL) signal, the other one of the two single-ended signals including the low speed serial data (SDA) signal, and neither of the two single-ended signals including the high speed video signals.

12. The system of claim 11, wherein:
    at any given time, the receiver can be in one of the first mode and the second mode;
    the receiver treats signals received at its two inputs as a differential signal, when the receiver is in the first mode; and
    the receiver treats signals received at its two inputs as two single-ended signals when the receiver is in the second mode.

13. The system of claim 11, wherein:
    the first mode is an active mode; and
    the second mode is a sleep or standby mode.

14. The system of claim 11, wherein the second mode is a reduced power mode as compared to the first mode.

15. The system of claim 11, wherein the transmitter includes a pair of switches that enable the low speed serial clock (SCL) and serial data (SDA) signals to be transmitted either as an embedded portion of the differential signals across the pair of wires, or as two separate single-ended signals across the same pair of wires.

16. The system of claim 11, wherein:
the transmitter includes a serializer and an output stage that produces the differential signals based on an output of the serializer; and
the receiver includes an input stage that produces single-ended signals based on the differential signals received at the two inputs of the receiver, and a deserializer that receives an output of the input stage.

17. A system for transmitting signals across a pair of wires, comprising:
means for transmitting differential signals across the pair of wires during a period of time when the system is in an active mode, the differential signals comprising high speed video signals and low speed serial clock (SCL) and serial data (SDA) signals embedded with the high speed video signals; and
means for transmitting two single-ended signals across the same pair of wires during another period of time when the system is in a sleep or standby mode, neither of the two single-ended signals comprising the high speed video signals, one of the two single-ended signals comprising the low speed serial clock (SCL) signal, and the other one of the two single-ended signals comprising the low speed serial data (SDA) signal.

18. The method of claim 1, further comprising:
when the device is in the sleep or standby mode, disabling at least some circuitry that is used for transmitting differential signals across the pair of wires, to thereby reduce power consumption.

19. The system of claim 11, wherein:
the transmitter is part of a first transceiver of the system; and
the receiver is part of a second transceiver of the system.

20. The system of claim 17, wherein when the system is in the sleep or standby mode, at least some circuitry, used for transmitting differential signals across the pair of wires, is disabled to thereby reduce power consumption.

21. The method of claim 1, wherein:
the high speed video signals are transmitted at a first speed that is at least 1 MHz; and
the low speed serial clock (SCL) and serial data (SDA) signals are transmitted at a lower speed than the first speed, the lower speed being no more than 400 KHz.

22. The system of claim 11, wherein:
the high speed video signals are transmitted at a first speed that is at least 1 MHz; and
the low speed serial clock (SCL) and serial data (SDA) signals are transmitted at a lower speed than the first speed, the lower speed being no more than 400 KHz.

23. The system of claim 17, wherein:
the high speed video signals are transmitted at a first speed that is at least 1 MHz; and
the low speed serial clock (SCL) and serial data (SDA) signals are transmitted at a lower speed than the first speed, the lower speed being no more than 400 KHz.

24. The method of claim 1, further comprising:
monitoring for at least one of a data enable signal (DATAEN) and a processor clock signal (PCLK); and
selecting a mode of operation, based on results of the monitoring, the mode of operation being one of the active mode and the sleep or standby mode.

25. The method of claim 6, further comprising:
monitoring for at least one of a data enable signal (DATAEN) and a processor clock signal (PCLK); and
selecting one of the first and second modes based on results of the monitoring.

26. The system of claim 9, further comprising a mode controller configured to:
monitor for at least one of a data enable signal (DATAEN) and a processor clock signal (PCLK); and
select one of the first and second modes based on whether the at least one of the data enable signal (DATAEN) and the processor clock signal (PCLK) is/are detected.

27. The system of claim 17, further comprising:
means for monitoring for at least one of a data enable signal (DATAEN) and a processor clock signal (PCLK); and
means for selecting one of the active mode and the sleep or standby mode based on whether the at least one of the data enable signal (DATAEN) and the processor clock signal (PCLK) is/are detected.

* * * * *